United States Patent [19]

Hosogoe

[11] Patent Number: 4,806,917
[45] Date of Patent: Feb. 21, 1989

[54] X-Y DIRECTION INPUT DEVICE

[75] Inventor: Junichi Hosogoe, Miyagi, Japan

[73] Assignee: Alps Electric Co., Ltd., Japan

[21] Appl. No.: 206,915

[22] Filed: Jun. 13, 1988

Related U.S. Application Data

[63] Continuation of Ser. No. 904,471, Aug. 29, 1986, abandoned.

[30] Foreign Application Priority Data

| Sep. 5, 1985 | [JP] | Japan | 60-135040[U] |
| Sep. 5, 1985 | [JP] | Japan | 60-135041[U] |
| Sep. 5, 1985 | [JP] | Japan | 60-135042[U] |
| Sep. 5, 1985 | [JP] | Japan | 60-135043[U] |

[51] Int. Cl.$^4$ .............................................. G09G 1/00
[52] U.S. Cl. .................................... 340/710; 340/709; 74/471 XY
[58] Field of Search ........................ 340/710, 709, 706; 178/18, 19, 20; 74/471 XY, 198; 200/6 A; 273/148 B; 33/1 M

[56] References Cited

U.S. PATENT DOCUMENTS

| 3,395,589 | 8/1968 | Gersten | 74/471 XY |
| 3,541,541 | 11/1970 | Engelbart | 340/324 |
| 3,987,685 | 10/1976 | Opocensky | 340/710 |
| 4,246,452 | 1/1981 | Chandler | 340/709 |
| 4,404,865 | 9/1983 | Kim | 74/471 XY |
| 4,464,652 | 8/1984 | Lapson et al. | 340/710 |
| 4,469,330 | 9/1984 | Asher | 200/6 A |
| 4,562,314 | 12/1985 | Hosogoe et al. | 340/710 |
| 4,652,871 | 3/1987 | Tsukada et al. | 340/710 |

Primary Examiner—John W. Caldwell, Sr.
Assistant Examiner—Alvin Oberley
Attorney, Agent, or Firm—Guy W. Shoup; Paul J. Winters; Leighton K. Chong

[57] ABSTRACT

An X-Y direction input device used, for example, in a graphic display apparatus includes some members enclosed in a casing and requiring electrical connection to each other. The casing is divided into upper and lower cases one of which has some chamber defining walls or ribs and the other has associated projections or pins, so as to accept the members previously connected physically, electrically to each other in the respective chambers and suppressingly support them in the chambers by the projections or pins.

3 Claims, 7 Drawing Sheets

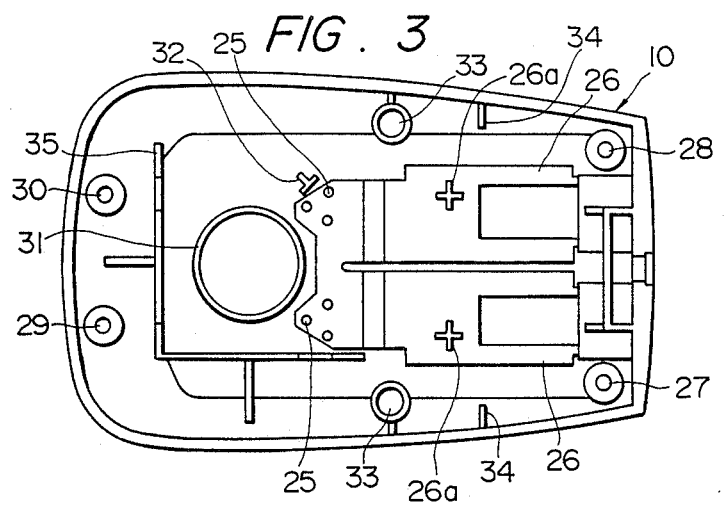
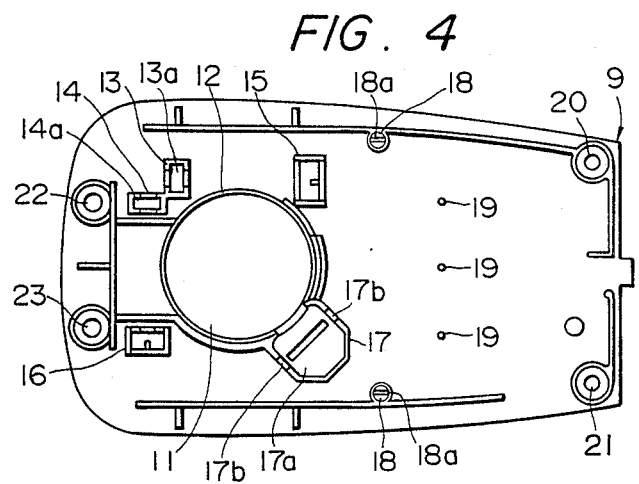
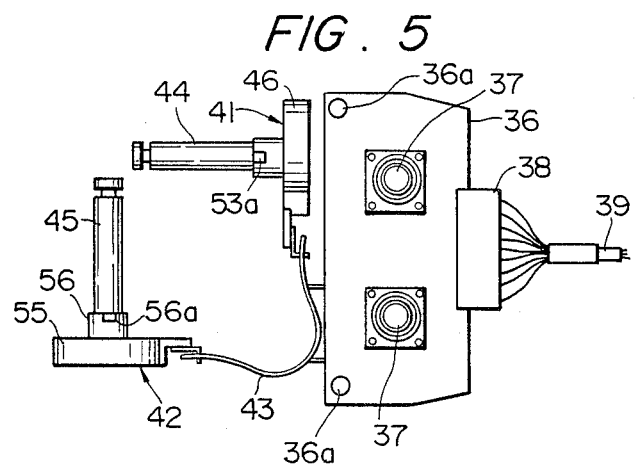

X-Y DIRECTION INPUT DEVICE

This application is a continuation of application Ser. No. 904,471, filed Aug. 29, 1986, now abandoned.

FIELD OF THE INVENTION

This invention relates to an X-Y direction input device the most suitable application of which is expected in a graphic display apparatus.

BACKGROUND OF THE INVENTION

A graphic display apparatus basically comprises a display screen, display controller, data channels and some input devices.

There are a lot of types of input devices one of which is an X-Y direction input device called "MAUSU" (tradename) configured to detect the moving direction and distance of a casing on a sheet.

The X-Y direction input device basically comprises a rotatably supported ball made of steel, for example, a first follower roller contacting and rotated by the ball, a second follower roller contacting and rotated by the ball and having an axis perpendicular to the axis of the first follower roller, first and second rotation detectors each including rotary electrical members such as a variable resistor and encoder to separately detect rotations of the first and second follower rollers, and a casing which receives and envelopes the ball, first and second follower rollers, first and second rotation detectors and other related members.

The casing has an aperture which opens at the bottom thereof to allow the ball to slightly project downward. When the casing is moved, rotating the ball along the sheet, the first and second follower rollers are rotated in predetermined different (X- and Y-) directions respectively. The amounts of rotation in the X- and Y-directions of the first and second follower rollers are detected by the first and second rotation detectors separately, as corresponding voltages or digital signals, and the signals are entered in the display apparatus.

The first and second rollers must be rotated in the casing, maintaining a perpendicular relationship between their axes. In the prior art arrangement, the rectangular relationship of the first and second follower rollers are established by previously fixing the follower rollers and first and second rotary electrical members in position of a frame and thereafter securing the frame to the casing by bolts.

Such an X-Y direction input device usually includes push switches to instruct deletion or dislocation of patterns displayed on the screen or to effect various signal processing for other switching and control operations. The push switch is fixed to a predetermined position of the casing by soldering it on a relatively hard switch board made of phenolic resin, for example, and thereafter securing the switch board to the casing by bolts. After the frame and switch board are secured to the casing, lead wires are soldered to lead terminals of the first and second rotary electrical members and terminals of the switch board to establish electrical connection therebetween.

Summarizing the prior art, assemblage of the X-Y direction input device is significantly complicated due to the bolt fixture of the frame and switch board to the casing and also due to subsequent soldering in a narrow space inside the casing for electrical connection.

OBJECT OF THE INVENTION

It is therefore an object of the invention to provide an X-Y direction input device significantly facilitating its assemblage.

SUMMARY OF THE INVENTION

According to the most basic feature of the invention, a casing is provided with a plurality of position defining members in predetermined positions to closely accept first and second rotary electrical members, switch board, and first and second follower rollers connected to the rotary electrical members after physically, electrically conjoining first and second rotary electrical members and the switch board by a flexible printed circuit board.

In a more specific feature of the invention, the casing may comprise an upper case and a lower case one of which has the position defining members and the other has a plurality of projections or pins, so that bearings of the first and second follower rollers and holders forming outer shells of the first and second rotary electrical members are closely accepted in chambers defined by the position defining members and are compressingly supported by the projections or pins.

In another specific feature of the invention, there is provided a frictional force applying means which includes a compression roller rotatably contacting the ball, a roller support member rotatably supporting both ends of the axle of the compression roller, a fixture member rotatably supporting the roller support member by pivots located at one end of the support member remote from the axle of the compression roller, and a spring biasing the other end of the roller support member toward the ball.

In a further specific feature of the invention, each rotation detector comprises a code plate having pattern areas and secured to and simultaneously rotated by the follower roller, sliders slidably contactable with the pattern areas of the code plate and a holder supporting respective ends of the sliders at a position remote from the code plate.

BRIEF DESCRIPTION OF THE DRAWINGS

All the drawings illustrate an embodiment of the invention in which:

FIG. 3 is a bottom view of an upper case of a casing 8;

FIG. 4 is a plan view of a lower case of the casing 8;

FIG. 5 is a plan view of major elements of a detection arrangement;

DETAILED DESCRIPTION

Figure 1:
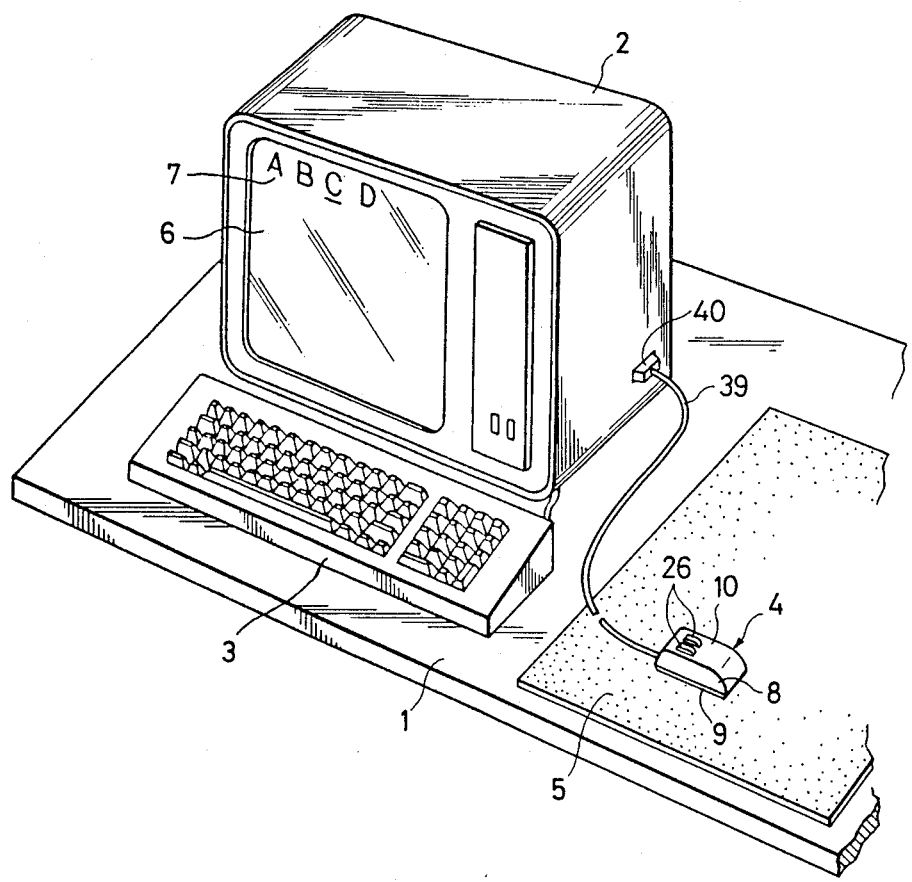
FIG. 1 is a general perspective view of a graphic display apparatus including an X-Y direction input device 4 according to the invention.

The invention is hereinbelow described in detail, referring to a preferred embodiment illustrated in the drawings.

FIG. 1 is a perspective of the entire system of a graphic display apparatus including an X-Y direction input device according to the invention.

A table 1 supports thereon a display apparatus 2 including a screen, controller, data channels and others; an input device 3 having function keys; and an input device 4 according to the invention. The input device 4 is moved on a sheet 5 specifically provided on the table 1, so as to move, for example, a cursor 7 to a desired position on a screen 6 of the display apparatus 2.

Figure 2:
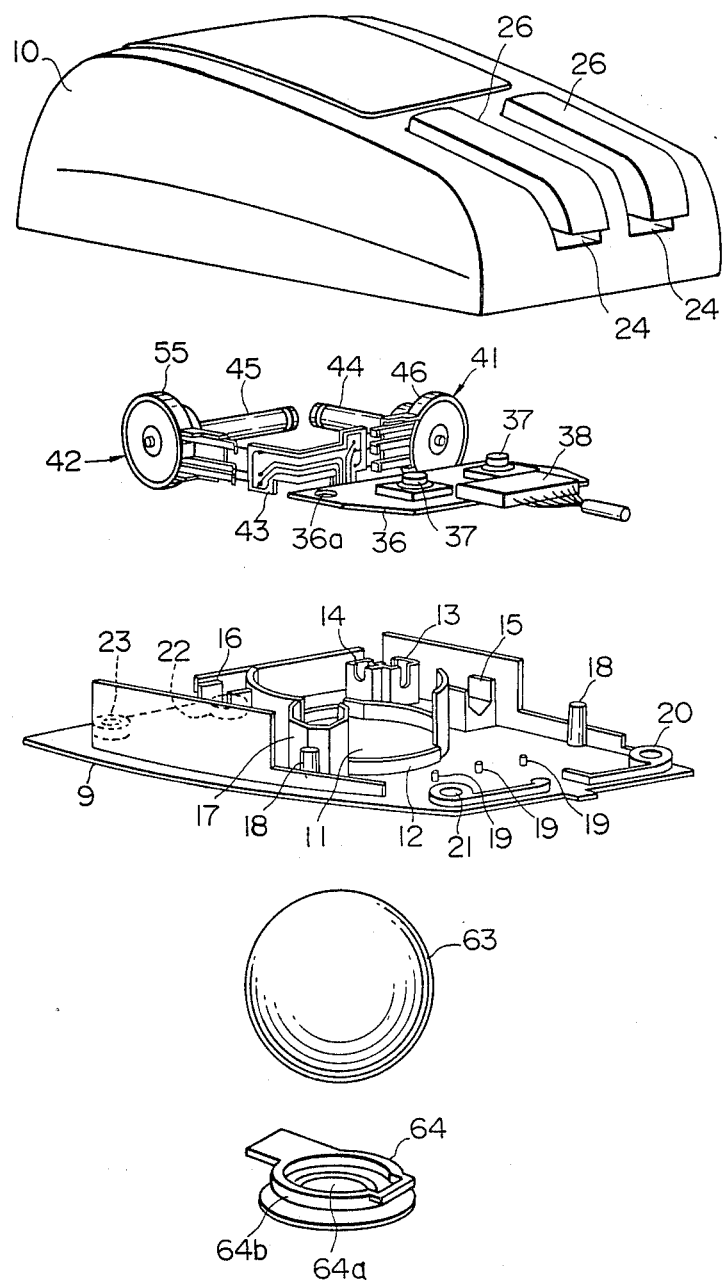
FIG. 2 is a perspective exploded view of members of the X-Y direction input device.

FIG. 2 is an exploded perspective view of various members of the input device 4, and FIGS. 3 through 5 show major members of the input device 4, in which FIG. 3 is a bottom view of an upper case of a casing, FIG. 4 is a plan view of a lower case of the casing, and FIG. 5 is a plan view of a detection arrangement.

A casing 8 which defines the outer margin of the input device 4 comprises a lower case 9 and an upper case 10 both made of ABS resin or others and united together by bolts (not shown).

The lower case 9 is provided with a large aperture 11 in a rear (lefthand in FIG. 4), central portion thereof, and a circumferential wall 12 standing and encircling the aperture 11. Around the aperture 11 and the circumferential wall 12 are provided two bearing chambers 13 and 14 and two holder chambers 15 and 16 slightly larger than the bearing chambers 13, 14. These chambers define positions of follower rollers and rotation detectors which will be described later. One bearing chamber 13 and one holder chamber 15 form one associated arrangement and the other bearing chamber 14 and holder chamber 16 form the other associated arrangement. These two arrangements are located so that their center lines make a right angle.

The circumferential wall 12 has a housing 17 integrally formed therewith and defining a chamber 17a for receiving a frictional force applying means which will be described later. The housing 17 has a pair of cutouts 17b at upper ends of opposed vertical walls thereof.

The lower case 9 has a pair of resilient vertical projections 18 close to the holder chamber 15 and housing 17, and three vertical support projections 19 near the resilient projections 18. The resilient projections 18 guide insertion of a switch board (described later) into a position of the lower case 9, whereas the support projections 19 hold the inserted switch board in position. The lower case has bolt holes 20, 21, 22 and 23 at two front positions and two rear positions.

The upper case 10 has a dimension suitable for single-hand operation, and its bulging upper wall has a pair of engage holes 24 formed at a front position thereof. As shown in FIG. 3, a plurality of welding pins 25 extend downward from the inner surface of the upper wall of the upper case 10, and secure end portions of a pair of linked switch levers 26 to the upper case 10. This fixture is established by first engaging small holes of the switch levers 26 with the welding pins 25 and subsequently welding and cooling the end portions of the welding pins 25. Thus operational ends of the switch levers 26 are rotatable about the opposite fixed ends thereof to an extent allowed by their resiliency. The operational ends of the switch levers 26 slightly project through the engage holes 24 when the other ends are fixed to the upper case 10.

The inner surface of the upper wall of the upper case 10 has screw holes 27, 28, 29 and 30 at positions corresponding to the screw holes 20, 21, 22 and 23 of the lower case 9, an annular rib 31 corresponding to the aperture 11, a push projection 32 corresponding to the housing 17, cylindrical projections 33 corresponding to the resilient projections 18, and a pair of push ribs 34 near the cylindrical projections 33. The inner surface of the upper wall of the upper case 10 has an L-shaped compression wall 35 one extension of which is aligned with the center line made by the bearing chamber 13 and the holder chamber 15 and the other extension of which is aligned with the center line made by the other bearing chamber 14 and holder chamber 16.

The chamber defined by the upper and lower cases 9 and 10 receives major parts of a detector arrangement shown in FIG. 5. Referring to FIG. 5, a switch board 36 made of a relatively hard insulative material such as phenolic resin has two positioning holes 36a corresponding to the resilient projections 18 of the lower case 9, and two push switches 37 and a connector 38 soldered thereon. The push switches 37 and connector 38 are electrically connected by a pattern wiring (not shown) formed on the rear surface of the switch board 36.

The push switches 37 are used as a power switch of the input device 4 itself and also as a signal processing switch to delete or dislocate part of a pattern just above the cursor 7 on the display apparatus 2 or to effect other switching or control operations. The display apparatus 2 and the input device 4 are connected by a code 39 and a plug 40 as shown in FIG. 1.

A flexible firm plate 43 having a desired pattern wiring is soldered to the switch board 36 and the rotation detectors, i.e., the first and second encoders 41 and 42. First and second follower rollers 44 and 45 are conjoined to the first and second encoders 41 and 42, respectively. Therefore, the first and second follower rollers 44, 45, first and second encoders 41, 42 and switch board 36 supporting the push switches 37, connector 38 and others are physically and electrically connected by the flexible film plate 43 before they are mounted in the casing.

Figure 6:
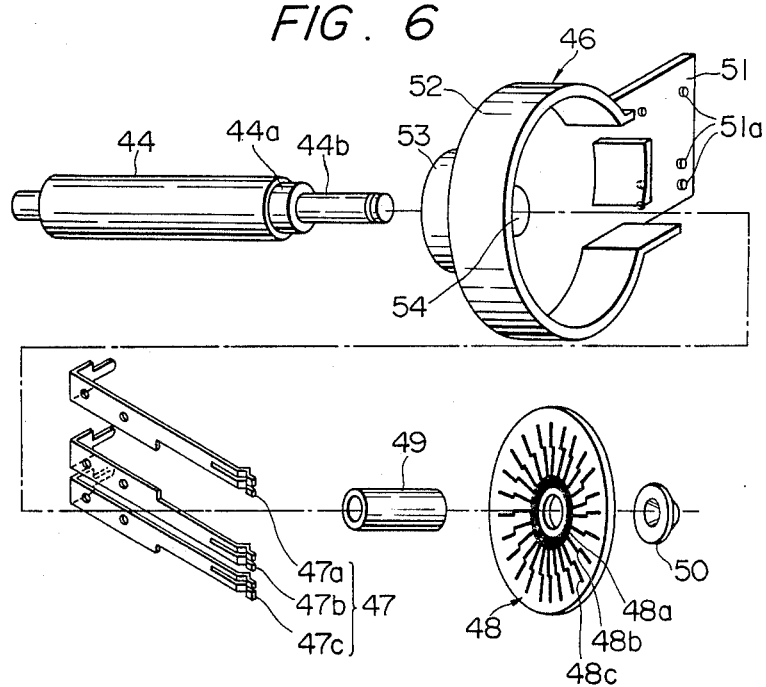
FIG. 6 is a perspective exploded view of a roller and encoder.
Figure 7:
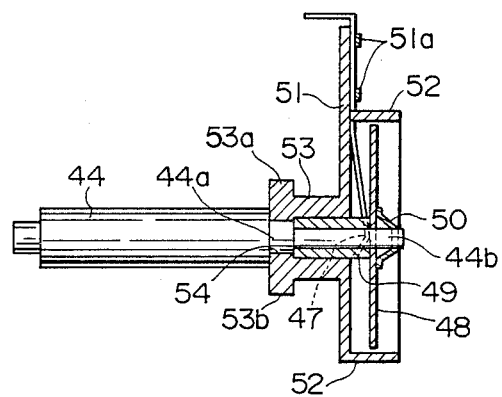
FIG. 7 is a cross-sectional view of the roller and encoder which are conjoined.

FIGS. 6 and 7 illustrate the internal structure of the first encoder 41, in which FIG. 6 is an exploded perspective view, and FIG. 7 is a cross-sectional view of the assembled encoder.

Referring to these drawings, the first encoder 41 includes a holder 46 forming the outer shell of the encoder; three sliders 47a, 47b and 47c; a code plate 48 having a common pattern 48a in the center, an inner circumferential pattern 48b and an outer circumferential pattern 48c; a cylindrical spacer 49; and a stopper nut 50.

The holder 46 has a planar portion 51 having one surface with a circumferential wall 52 and the other surface with a cylindrical bearing portion 53. The bearing portion 53 is formed with a projection 53a and a positioning projection 53b at upper and lower positions. The bearing portion 53 is located in a central position of the circumferential wall 52 and defines a bearing hole 54. The planar portion 51 has a plurality of welding pins 51a in an area radially outward of the circumferential wall 52 to secure ends of the sliders 47a, 47b and 47c to the planar portion 51. Each slider 47 with one end secured by the welding pin 51a extends into the interior of the circumferential wall 52 through one or more cutouts partly breaking the circumferential wall 52.

The first follower roller 44 has at one end thereof an engagement shaft portion 44b slightly smaller in diameter than the major part thereof, and an insertion shaft portion 44a smaller in diameter than the engagement shaft portion 44b. These shaft portions are inserted into the bearing hole 54 so that the insertion shaft portion 44b enter in the circumferential wall 52. The insertion shaft portion 44b in the circumferential wall is provided with the spacer 49 and engages the code plate 48. When the stopper nut 50 is applied to the distal end of the insertion shaft portion 44b, the code plate 38 is immovably secured to the first follower roller 44. At that time, since the step defined by the different diameters of the major portion and the engagement portion 44a of the first follower roller 44 abuts the peripheral edge of the bearing hole 54, whereas the inner end of the spacer 49 abuts a step in the bearing hole 54, the first follower roller 44 is axially immoved with respect to the first encoder 41. Also, the code plate 48 is maintained apart from the planar portion 51 by the spacer 49.

When the first follower roller 44 and code plate 48 are united together with the holder 46 as described above, resilient contacts are established between first slider 47a and the common pattern 48a, between the second slider 47b and the inner circumferential pattern 48b, and between the third slider 47c and the outer circumferential pattern 48c. Above-described location of the fixed ends of the sliders 47a, 47b and 47c remote from the code plate 48 provides a long span from the fixed ends to the resilient contact points with the code plate 48, and provides a reliable sliding torque.

The second encoder 42 has the same structure as the above-described structure of the first encoder 41. Repeatedly, the second encoder 42 has a holder 55 (FIGS. 2 and 5) forming the outer shell of the encoder; three sliders supported by the holder 55; and a code plate fixed to one end of a second follower roller 45 and contacting the sliders. The holder 55 has a bearing portion 56 projecting from one side thereof. The bearing portion 56 has a projection 56a in an upper position and a positioning projection (not shown) in a lower position.

The frictional force applying means which was referred to above is hereinbelow described, referring to FIGS. 8 and 9.

Figure 8:
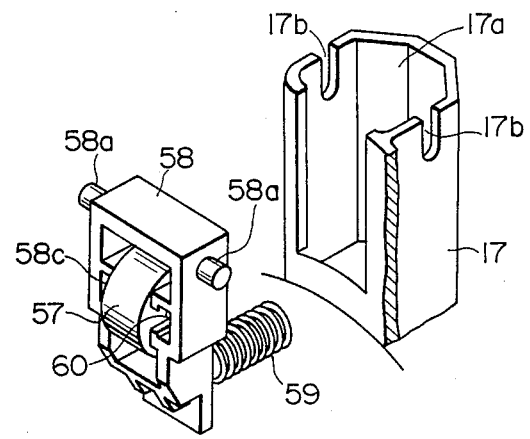
FIG. 8 is an exploded perspective view of a compression roller, axle, roller support member, housing and coil spring.
Figure 9:
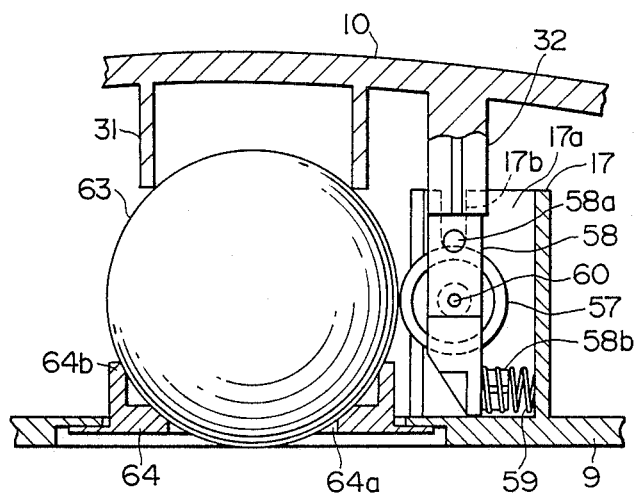
FIG. 9 is a cross-sectional view of the members of FIG. 8 involved.

As shown in FIG. 8, the frictional force applying means comprises a compression roller 57 made of a plastic resin, a roller support member 58 supporting the compression roller 57, the housing 17 supporting the roller support member 58, and the coil spring 59.

The roller support member 58 molded from a plastic resin has a pair of pivots 58a at upper portion of side walls, a spring support projection 58b (FIG. 9) at a lower position on the back surface, and a bearing portion 58c provided in a central position between the pivots 58a and the spring support projection 58b and opening to the front face. A shaft 60 passes through the compression roller 57, and the bearing portion 58c receives both ends of the shaft 60 forcibly inserted therein to support the compression roller 57 rotatably about the shaft 60 with respect to the roller support member 58.

The roller support member 58 which includes the compression roller 57 inside and carries the coil spring 59 on the spring support projection 58b is inserted in the chamber 17a of the housing 17, with the pivots 58a entering in the cutout 17b of the housing 17 and with the coil spring 59 contracted between the roller support member 58 and the inner wall of the housing 17. Due to the revival force of the coil spring 59, the roller support member 58 is energized clockwise about the pivots 58a, and the compression roller 57 supported by the roller support member 58 slightly projects from the housing 17 toward the aperture 11 so that the roller support member 58 contacts the inner wall of the housing 17 to prevent the roller support member 58 and compression roller 57 from inadvertently disengaging from the housing.

Figure 10:
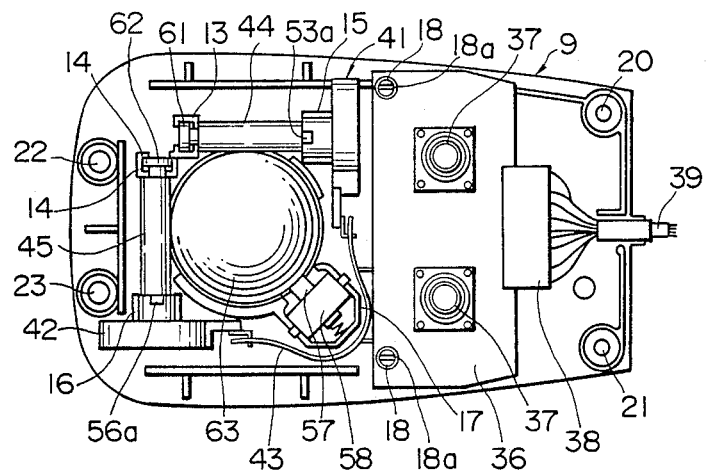
FIG. 10 is a plan view of the input device, with the upper case of the casing being removed.
Figure 11:
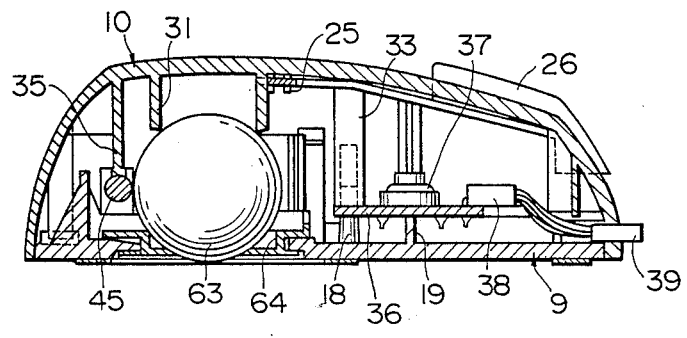
FIGS. 11 and 12 are different sectional views of the entire input device.
Figure 12:
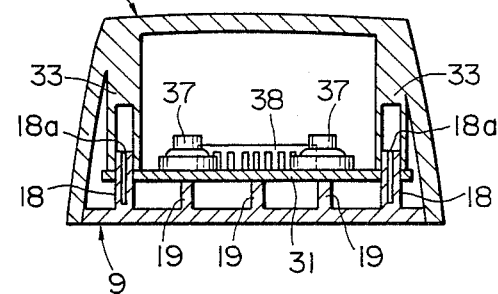

Referring to FIGS. 10 through 12, how to assemble the input device 4 arranged as described above is hereinbelow explained. FIG. 10 is a plan view of the input device 4 in which the upper case 10 is removed, FIG. 11 is a cross-sectional view taken along the length direction of the casing 8, and FIG. 12 is a cross-sectional view taken along the width direction of the casing 8.

As shown in FIGS. 10 and 4, metal bearings 61 and 62 are applied and secured to the cutout 13a, 14a of the bearing chambers 13, 14 formed on the lower case 9. Subsequently, the preliminarily united arrangement of first follower roller 44, first encoder 41, second follower roller 45, second encoder 42 and switch board 36 (FIG. 5) is put on the lower case 9 so that respective ends of the first and second rollers 44, 45 engage the metal bearings 61, 62, and the first and second encoders 41, 42 engage the holder acceptors 15, 16 through the guide of the positioning projections 53b (the positioning pin of the second encoder 42 is not shown). Accordingly, the first and second follower rollers 44 and 45 are located in position of the lower case 9 so that their axes make a right angle.

The switch board 36 is fixed in position of the lower case 9 by engagement between two positioning holes 36a and the resilient projections 18 of the lower case 9, and also supported on three support pins 19. Since the resilient projections 18 have axially elongated grooves 18 to form bifurcated ends, they never fail to engage the positioning holes 36a regardless of possible changes in diameter of the hole or projection due to drilling errors or heat deformation.

As described, since the first and second follower rollers 44, 45, first and second encoders 41 and switch board 36 are mounted on the lower case 9 after they are united together by the flexible film plate 43, they never come to pieces during assemblage and can be readily assembled without requiring post-assemblage, complicated welding.

Subsequently, the roller support member 58 which already includes the compression roller 57 in position and carries the coil spring 59 on the spring support projection 58b is inserted in the interior 17a of the housing 17, with the pivots 58a engaging the cutout 17b at the upper end of the housing 17. The latter assemblage may precede the former of the first and second follower rollers 44, 45 and others.

After the major parts of the detector arrangement are mounted in position of the lower case 9, as shown in FIGS. 11 and 12, the upper case 10 is put on the lower case 9, and they are united together by bolts (not shown) applied to the bolt holes 20, 21, 22 and 23 of lower case 9 and the bolt holes 27, 28, 29 and 30 of the upper case 10.

When the unitary structure of the casing is established, the metal bearings 61, 62, projections 53a, 56a of the first and second encoders 41, 42 and the upper walls of the holders 46, 56 are compressed by the urging wall 35 of the upper case 10, and the first and second follower rollers 44, 45 and first and second encoders 41, 42 are closely sandwiched by the upper and lower cases 9, 10. Similarly, the lower end of the vertically extending push projection 32 of the upper case 10 contacts the upper surface of the roller support member 58 and prevents same from dropping out of the housing 17. Further, lower ends of the cylindrical projection 33 and compression rib 34 mounted on the resilient projection 18 contacts the upper surface of the switch board 36 so as to closely sandwich the switch board 36 between them and three support pins 19 vertically extending from the lower case 9.

As described before, two push switches 37 are soldered to the upper surface of the switch board 36, whereas respective ends of two switch levers 26 are secured to the upper wall of the upper case 10, with the operational portions 26a vertically extending from the lower surfaces of the switch levers 26. The lower surfaces of the operational portions 26a are opposed to the upper surfaces of the push switches 37 when the upper and lower cases 9, 10 are united together, so that when an operator compresses the switch lever 26 projecting from the upper wall of the upper case 10, the operational portion 26a contacts associated one of the push switches 37 to establish a desired switching operation.

After the upper and lower cases 9 and 10 are conjoined, the ball 63 made of steel is inserted in the interior of the casing 8 through the aperture 11 of the lower case 9. Thereafter, a cover member 64 having an aperture 64a is fixed along the circumference of the aperture 11 of the lower case 9 to rotatably hold the ball 63 in the casing 8 except small part thereof exposed outside, by cooperation of the circumferential rib 31 of the upper case 10 and a circumferential supporter 64b of the cover member 64 (FIG. 9).

Figure 13:
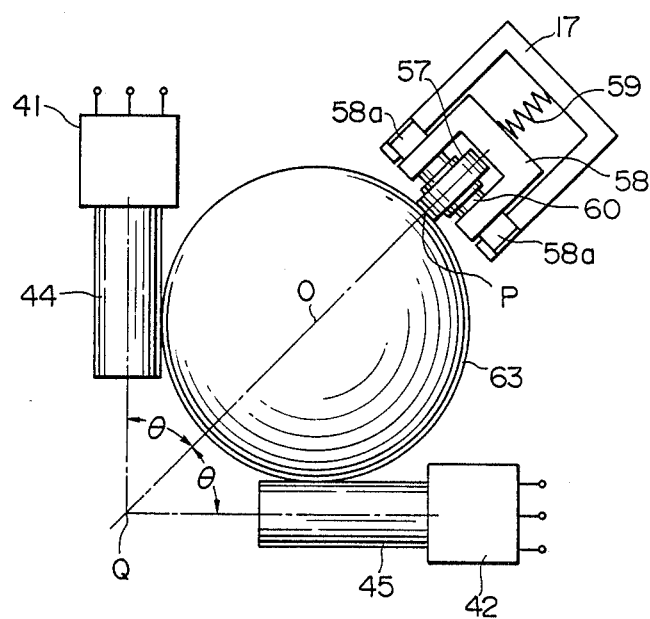
FIG. 13 is a fragmentary view of the input device to show how to detect rotations of the follower rollers.

Referring to FIG. 13, how to detect rotations in the aforegoing embodiment is hereinbelow explained.

The ball 63 closely contacts the first and second follower rollers 44, 45 due to compression from the compression roller 57. The axial direction of the first follower roller 44 is perpendicular to the axial direction of the second follower roller 45, and they contact the ball 63 from perpendicular directions. The compression roller 57 is located on a line connecting the intersection Q of the axes of the first and second follower rollers 44, 45 and the center 0 of the ball 63, and applies the force from the coil spring 59 to the ball 63 to urge same against the first and second follower rollers 44, 45 by an equal force. Since the roller support member 58 rotatably supporting the compression roller 57 is supported by the housing 17 pivotably about the pivots 58a, rotation of the ball 63 never invites a positional deviation of the axle 60 of the compression roller 57 and pivots 58a, and the ball 58 always receives a well-balanced force from the compression roller 57.

To respective ends of the first and second follower rollers 44, 45 are connected the first and second encoders 41, 42 which detect rotation amounts of the first and second follower rollers. In this way, rotation of the ball 63 is detected, separating it in X- and Y-directional components.

Summarizing the invention, the first and second rotary electrical members conjoined to the first and second follower rollers and the switch board carrying the push switches are preliminarily connected electrically and mechanically into a single unit by the flexible printed board before they are mounted in the casing configured to define specific positions of the these members. Therefore, the single unit never falls to pieces while it is mounted in the casing, and soldering connection of the printed board to the rotary electrical members and switch board can be effected in a free space outside the casing before it is entered in same.

The invention has succeeded in omission of specific frames used in the prior art device to envelope in-casing members and omission of bolts used to fix the frames to the casing, by employing the arrangement wherein the bearings supporting the first and second follower rollers and the holders forming outer shells of the first and second rotary electrical members are accepted in positions specifically defined by the positioning means of the upper or lower case and are closely sandwiched between both cases when the cases are conjoined.

The frictional force applying means used in the invention device comprises the compression roller rotatably compressing the ball, roller support member rotatably supporting both ends of the axle of the compression roller, the fixture member rotatably supporting the roller support member at one end thereof remote from the axle of the compression roller, and a spring provided at the other end remote from the shaft to bias the roller support member toward the ball. This arrangement significantly reduces the possibility that the shaft of the compression roller and the pivots of the roller support member deviate during rotation of the ball, and never fails to compress the ball to the first and second follower rollers by an even force. This provides a significantly accurate detection in the X-Y direction input device.

Each rotation detector comprises a code plate having some pattern areas and secured to and concurrently rotated by the follower roller, sliders slidably contactable with the pattern areas of the code plate, and a holder supporting respective ends of the sliders, locating the junctions of the sliders with respect to the holder at a position remote from the code plate. Therefore, the span of each slider from the secured point up to the contactable point may be elongated as desired to reduce the sliding torque.

The embodiments of the invention in which an exclusive property or privilege is claimed are defined as follows:

1. In an X-Y direction input device comprising a rotary ball, a first follower roller contacting the rotary ball for axial rotation therewith to indicate a first input direction, a second follower roller contacting the rotary ball for axial rotation therewith disposed in an axial direction perpendicular to that of the first follower roller to indicate a second input direction, a first rotary-type electrical member axially connected to the first follower roller for detecting the axial rotation thereof, a second rotary-type electrical member axially connected to the second follower roller for detecting the axial rotation thereof, a switch board having push switches thereon provided for controlling certain functions of the input device, and switch actuating members for actuating the push switches, and a casing for holding the rotary ball, first and second follower rollers, first and second rotary-type electrical members, and switch board in respective defined positions therein, the improvement comprising:
each said rotary-type electrical member including a code plate having pattern areas which is secured to the corresponding follower roller for rotation, sliders contactable with said pattern areas of said code plate, and a holder supporting respective ends of said sliders having electrical junctions thereof at one end remote from said code plate, wherein said first and second rotary-type electrical members are positioned such that said one ends of their respective holders extend toward each other;

a flexible printed circuit board having a first side which is electrically and mechanically connected to said electrical junctions on said one end of said holder of said first rotary-type electrical member, a second side which is electrically and mechanically connected to said electrical junctions on said one end of said holder of said second rotary-type electrical member, and a third side which is electrically and mechanically connected to said switch board, wherein said first and second follower rollers, first and second rotary-type electrical members, and switch board are conjoined in a single assemblage with said flexible printed circuit board such that they are positioned relative to each other in a unitary structure in the same positions as their respective defined positions in the casing;

said casing having a plurality of position defining means for receiving said single assemblage as a unit and holding each of said conjoined first and second follower rollers, first and second rotary-type electrical members, and switch board in their respective defined positions.

2. An X-Y direction input device of claim 1 wherein said casing comprises upper and lower cases one of which has a plurality of position defining recesses constituting said positive defining means and the other has a plurality of projections or pins, so that bearings of said first and second follower rollers and holders forming outer shells of said first and second rotary electrical members are individually accepted in corresponding chambers defined by said position defining recesses and are also suppressingly supported by said projections or pins.

3. An X-Y direction input device of claim 1 further comprising a frictional force applying means which includes a compression roller rotatably contacting said ball, a roller support member rotatably supporting both ends of an axle of said compression roller, a fixture member rotatably supporting said roller support member at one end thereof remote from said axle, and a spring biasing said roller support member at the other end thereof remote from said one end toward said ball.

* * * * *

UNITED STATES PATENT AND TRADEMARK OFFICE
CERTIFICATE OF CORRECTION

PATENT NO. : 4,806,917

DATED : February 21, 1989

INVENTOR(S) : Junichi Hosogoe

It is certified that error appears in the above-identified patent and that said Letters Patent is hereby corrected as shown below:

Title page:

Related U.S. Application Data:

Continuation of Ser. No. should be --902,471--.

In the Specification:

Col. 1, line 2, delete "904,471" and insert --902,471--.

Signed and Sealed this

Twenty-second Day of August, 1989

Attest:

DONALD J. QUIGG

Attesting Officer

Commissioner of Patents and Trademarks